(12) United States Patent
Farkas

(10) Patent No.: US 10,446,934 B2
(45) Date of Patent: Oct. 15, 2019

(54) FOLDED UWB MONOPOLE ANTENNA FOR BODY MOUNTED TRANSMITTER AND MANUFACTURING METHOD

(71) Applicant: Isolynx, LLC, Haverhill, MA (US)

(72) Inventor: Alexander T. Farkas, Chatham, MA (US)

(73) Assignee: ISOLYNX, LLC, Haverhill, MA (US)

( * ) Notice: Subject to any disclaimer, the term of this patent is extended or adjusted under 35 U.S.C. 154(b) by 0 days.

(21) Appl. No.: 15/780,982

(22) PCT Filed: Nov. 23, 2016

(86) PCT No.: PCT/US2016/063664
§ 371 (c)(1),
(2) Date: Jun. 1, 2018

(87) PCT Pub. No.: WO2017/095711
PCT Pub. Date: Jun. 8, 2017

(65) Prior Publication Data
US 2018/0269584 A1    Sep. 20, 2018

Related U.S. Application Data

(60) Provisional application No. 62/261,635, filed on Dec. 1, 2015.

(51) Int. Cl.
*H01Q 9/42* (2006.01)
*H01Q 1/36* (2006.01)
(Continued)

(52) U.S. Cl.
CPC ............... *H01Q 9/42* (2013.01); *H01Q 1/273* (2013.01); *H01Q 1/36* (2013.01); *H01Q 9/46* (2013.01); *H01Q 25/005* (2013.01)

(58) Field of Classification Search
CPC .......... H01Q 5/25; H01Q 9/0414; H01Q 9/28; H01Q 9/40; H01Q 9/42
See application file for complete search history.

(56) References Cited

U.S. PATENT DOCUMENTS 7,973,731 B2   7/2011  Parsche
8,081,120 B2   12/2011 Yoshioka
(Continued)

OTHER PUBLICATIONS

International Search Report and Written Opinion of PCT/US2016/063664 dated Mar. 24, 2017, 11 pp.

*Primary Examiner* — Daniel Munoz
(74) *Attorney, Agent, or Firm* — Lathrop Gage LLP

(57) ABSTRACT

Systems and methods improve tracking performance of an ultra-wide-band (UWB) tracking tag positioned on a player on a sporting field. A UWB antenna is formed with power radiated disproportionately in forward and backward directions as compared to sideways. The UWB tracking tag is aligned with the UWB antenna when positioned on the player such that less power is absorbed by the player than radiated away from the player. The UWB antenna is monopole and may be folded from a single metal sheet forming: a flat top; a first side folded at an acute angle from one edge of the top; a second side folded at an acute angle from another edge of the top; a first solder tab folded at an obtuse angle from the first side; and a second solder tab folded at an obtuse angle from the second side, to join in parallel with the first solder tab.

13 Claims, 14 Drawing Sheets

(51) Int. Cl.
*H01Q 1/27* (2006.01)
*H01Q 9/46* (2006.01)
*H01Q 25/00* (2006.01)

(56) References Cited

U.S. PATENT DOCUMENTS

| | | | |
|---|---|---|---|
| 8,791,872 B2 | 7/2014 | Coupez | |
| 8,963,784 B2 | 2/2015 | Zhu et al. | |
| 2005/0156804 A1* | 7/2005 | Ratni | H01Q 9/28 343/773 |
| 2006/0097925 A1 | 5/2006 | Lee | |
| 2006/0256025 A1* | 11/2006 | Askildsen | H01Q 9/28 343/807 |
| 2010/0315303 A1* | 12/2010 | Kearney | H01Q 1/36 343/767 |
| 2011/0227804 A1* | 9/2011 | Nilsson | H01Q 9/28 343/840 |
| 2015/0357715 A1* | 12/2015 | Behdad | H01Q 7/00 343/855 |

* cited by examiner

US 10,446,934 B2

FOLDED UWB MONOPOLE ANTENNA FOR BODY MOUNTED TRANSMITTER AND MANUFACTURING METHOD

RELATED APPLICATIONS

This application is a 35 U.S.C. § 371 filing of International Application No. PCT/US2016/063664, filed Nov. 23, 2016, which claims the benefit of and priority to U.S. Patent Application Ser. No. 62/261,635, titled "Folded UWB Monopole Antenna for Body Mounted Transmitter and Manufacturing Method", filed Dec. 1, 2015, which is incorporated by reference herein in its entirety.

BACKGROUND

Wireless ultra-wide-band (UWB) tracking tags are used to track the location of athletes on a sporting field. Attaching tracking tags to athletes presents a challenge to the system designer. These tracking tags are designed to be as small as possible and are commonly mounted to shoulder pads of the athletes for contact sports, such as American Football. However, when positioned near the human body, transmission performance of the tracking tag is degraded.

The electrically short monopole antenna of the tracking tag is a wide-band and compact radiating element for the tracking tag. However, the human body and the pads are mostly absorptive of energy at UWB frequencies. Since the tracking tags are asymmetrically mounted onto the body, the typical omnidirectional pattern of the short monopole antenna results in loss of energy in one or more directions, such as when the energy is absorbed by the human body or shoulder pads.

SUMMARY OF THE INVENTION

In one embodiment, a folded UWB monopole antenna for a body-mounted transmitter includes a single metal sheet forming: (i) a flat top; (ii) a first side folded at an acute angle from one edge of the top; (iii) a second side folded at an acute angle from another edge of the top; (iv) a first solder tab folded at an obtuse angle from the first side; and (v) a second solder tab folded at an obtuse angle from the second side, to join in parallel with the first solder tab.

In another embodiment, a method manufactures a folded UWB monopole antenna for a body mounted transmitter. A single metal sheet is cut from a flat material to have a top, first and second sides, and first and second solder tabs. The first side is folded at an acute angle from one edge of the top. The second side is folded at an acute angle from another edge of the top. The first solder tab is folded at an obtuse angle from the first side, and the second solder tab is folded at an obtuse angle from the second side to join in parallel with the first solder tab.

In another embodiment, a method improves tracking performance of an ultra-wide-band (UWB) tracking tag positioned on a player on a sporting field. A UWB antenna is formed with power radiated disproportionately in forward and backward directions as compared to sideways. The UWB tracking tag is aligned with the UWB antenna when positioned on the player such that less power is absorbed by the player than radiated away from the player.

DETAILED DESCRIPTION OF THE EMBODIMENTS

For tracking athletes at a sporting event, receivers are located at fixed positioned around the sporting field or arena. Further, most sporting fields are substantially rectangular. Player movement is also substantially longitudinal (i.e., along the longest direction of the field). Therefore, an optimized approach would be to maximize forward and reverse propagation at the expense of sideward propagation. In other words, an antenna pattern which is oblong, oval shaped or generally rectangular in nature resulting in increased range in the up field and down field directions. Further, since less of the radiation is directed towards the athlete and equipment, less transmitted energy is absorbed by the athlete and the equipment, and therefore less power is wasted.

Tracking tag operation relies on miniature lightweight batteries. The dominant share of power consumption is the tracking tag transceiver. Optimizing the transmission and reception antenna pattern results in better overall power efficiency which extends battery life. The battery also dominates the size and weight of the tracking tag. The more efficient antenna allows for a design using a smaller and more lightweight battery.

Figure 1:
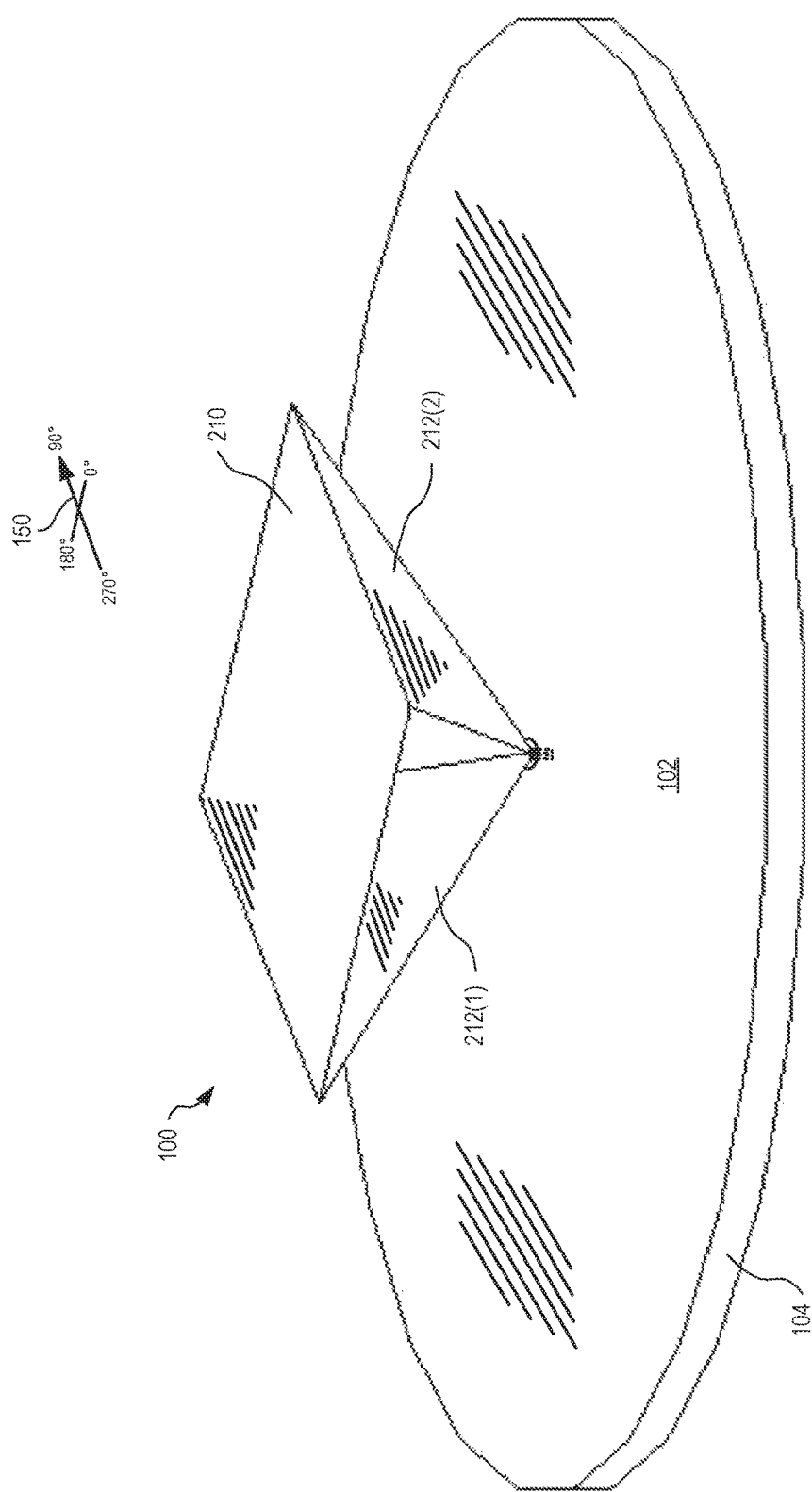
FIG. 1 is a perspective view showing one exemplary folded UWB monopole antenna for a body mounted transmitter, in an embodiment.

FIG. 1 is a perspective view showing one exemplary folded UWB monopole antenna 100 for a body mounted transmitter. Antenna 100 is shown positioned above a ground plane 102 and has an inverted pyramid shape. Antenna 100 is fabricated from 0.2 mm thick rolled steel that has a Tin matte finish that allows it to be easily soldered. However, it should be appreciated that antenna 100 may be fabricated from other materials having the same or different thickness.

Figure 2:
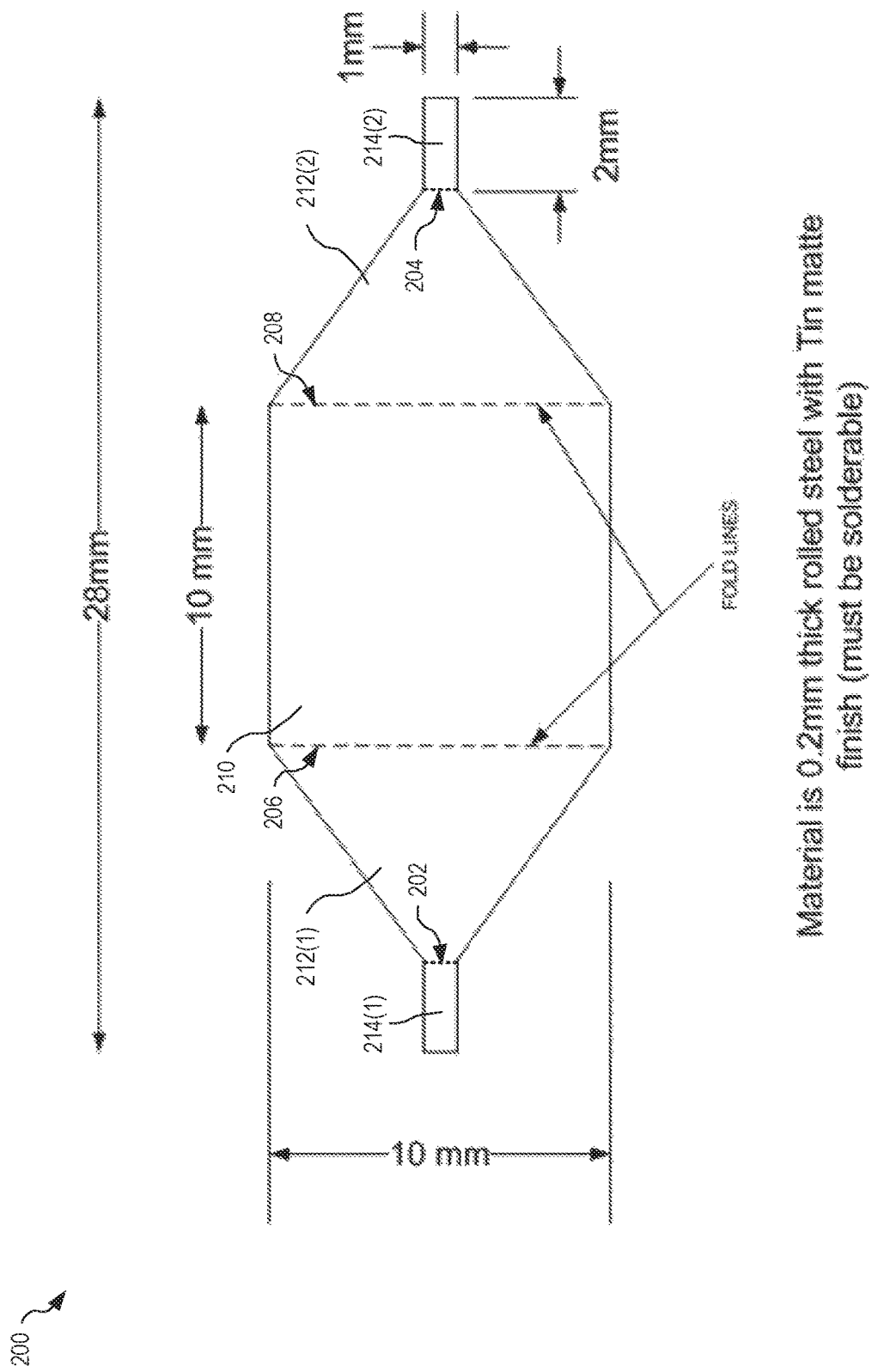
FIG. 2 shows a blank cutout from flat material prior to forming the antenna of FIG. 1, in an embodiment.

FIG. 2 shows a blank 200 cutout from flat material prior to forming the antenna 100 of FIG. 1, in an embodiment. For example, blank 200 may be punched from a flat sheet of 0.2 mm thick rolled steel with Tin matte finish. As shown, blank 200 has a top portion 210, two side portions 212(1) and 212(2) adjacent top portion 210, and two solder tabs 214(1) and 214(2) adjacent to side portions 212(1) and 212(2), respectively. To form antenna 100 from blank 200, a first fold 202 is made between side portion 212(1) and solder tab 214(1); a second fold 204 is made between solder tab 214(2) and side portion 212(2); a third fold 206 is made between top portion 210 and side portion 212(1); and a fourth fold 208 is made between top portion 210 and side portion 212(2). The shape and size of side portions 212 are selected based upon a desired height of antenna 100.

Figure 3:
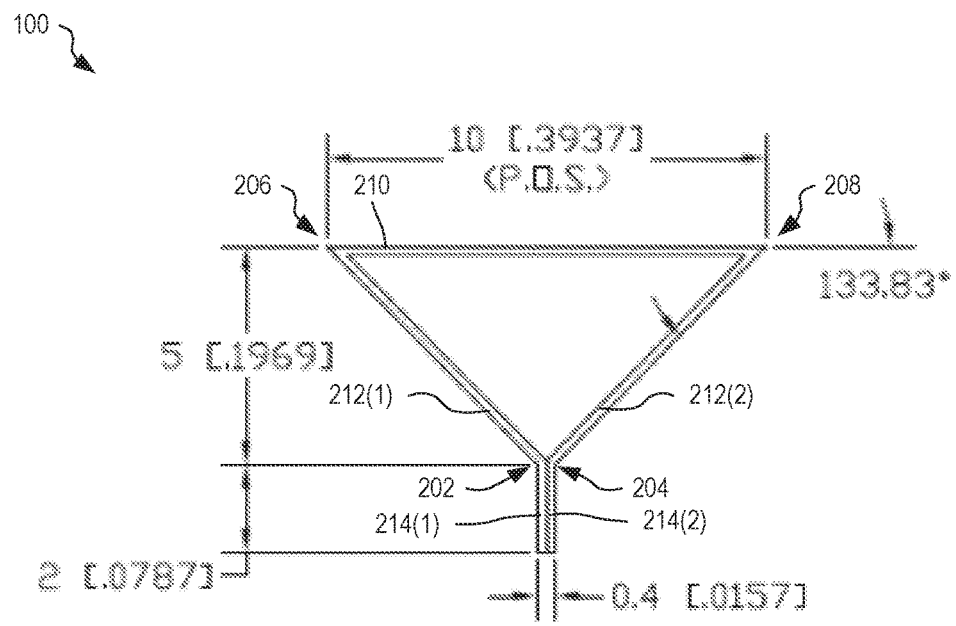
FIG. 3 shows a side elevation of the antenna of FIG. 1 formed from the blank of FIG. 2, in an embodiment.
Figure 4:
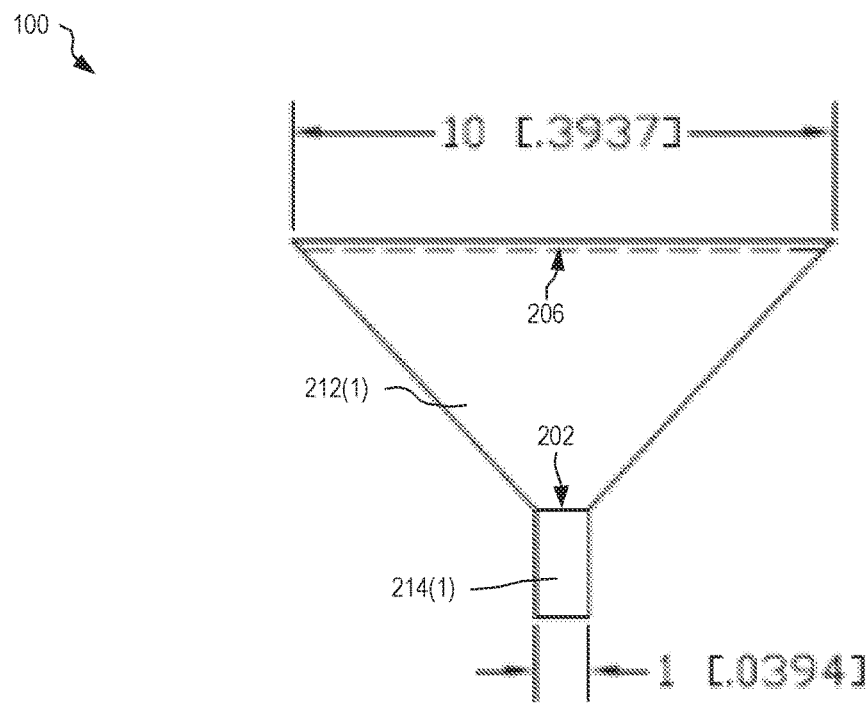
FIG. 4 shows a front elevation of the antenna of FIG. 1 formed from the blank of FIG. 2, in an embodiment.
Figure 5:
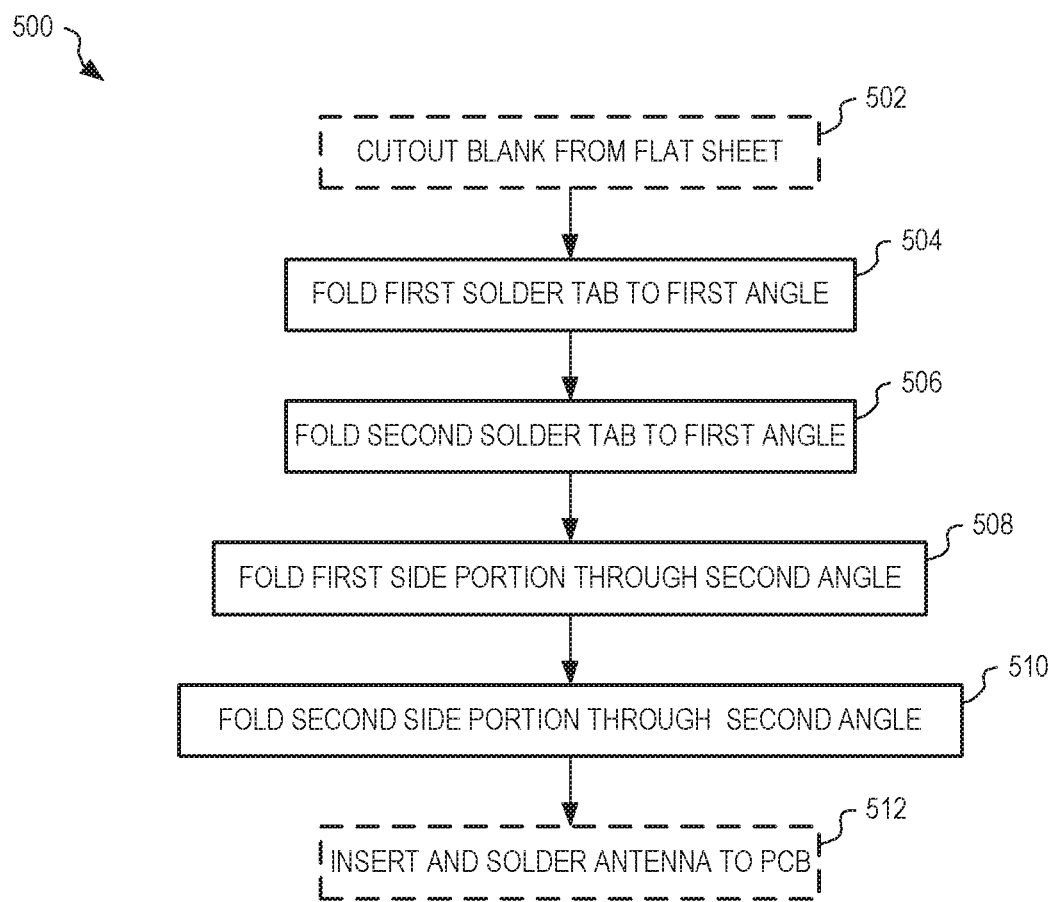
FIG. 5 is a flowchart illustrating one exemplary method for manufacturing the antenna of FIG. 1, in an embodiment.

FIG. 3 shows a side elevation of antenna 100 of FIG. 1 formed from blank 200 of FIG. 2. FIG. 4 shows a front elevation of the antenna 100 of FIG. 1 formed from blank 200 of FIG. 2. FIG. 5 is a flowchart illustrating one exemplary method 500 for forming antenna 100 of FIG. 1 from blank 200 of FIG. 3. FIGS. 2 through 5 are best viewed together with the following description. Dimensions within the figures are for exemplary purposes only and the present application is not limited in scope to the dimensions shown.

Step 502 of method 500 is optional. In step 502, method 500 cuts one or more blanks from a flat sheet. In one example of step 502, blank 200 is punched from a flat sheet of rolled steel. In steps 504 and 506, method 500 bends the solder tabs to a first angle. In one example of steps 504 and 506, at each fold 202 and 204, solder tabs 214(1) and 214(2) of blank 200 are each bent upwards at an angle of 46.17 degrees relative to side portions 212(1) and 212(2), respectively. In steps 508 and 510, first and second side portions and bent through a second angle. In one example of steps 508 and 510, side portions 212(1) and 212(2) are each bent, at folds 206 and 208, respectively, downwards through an angle of 133.83 degrees, relative to top portion 210, such that solder tabs 214(1) and 214(2) meet. Step 512 is optional. In step 512, method 500 inserts and solders the formed antenna to a PCB. In one example of step 512, solder tabs 214 of antenna 100 are inserted through a hole in a PCB and soldered to the PCB.

Steps of method 500 may be performed in a different order without departing from the scope hereof. For example, the order of steps 504 and 506 may be reversed, and the order of steps 508 and 510 may be reversed.

Antenna 100 is lighter in weight as compared to prior art PCB mount broadband monopole antenna designs that are turned from solid metal with complex shapes. Therefore, antenna 100 is also simpler, and cheaper, to manufacture as compared to these prior art antennae.

Antenna 100 is three-dimensional and has longitudinally symmetrical but non-uniform pattern distribution. The finished shape of antenna 100 resembles an inverted four sided pyramid with a continuous top surface (top portion 210) and two side surfaces (side portions 212). Propagation gain patterns in the azimuthal plane favor the non-continuous sides of the pyramid. As shown in FIG. 1, arrow 150 indicates the orientation of antenna 100 with the higher gain in the axis defined by the 90° and 270° directions of arrow 150 (hereinafter the "90°-270° axis"), corresponding to open sides of the pyramid. The lower vertex (i.e., at solder tabs 214) of the pyramid is the feed point for antenna 100 and is coplanar to a corresponding ground plane (e.g., ground plane 102 of FIG. 1).

Figure 6:
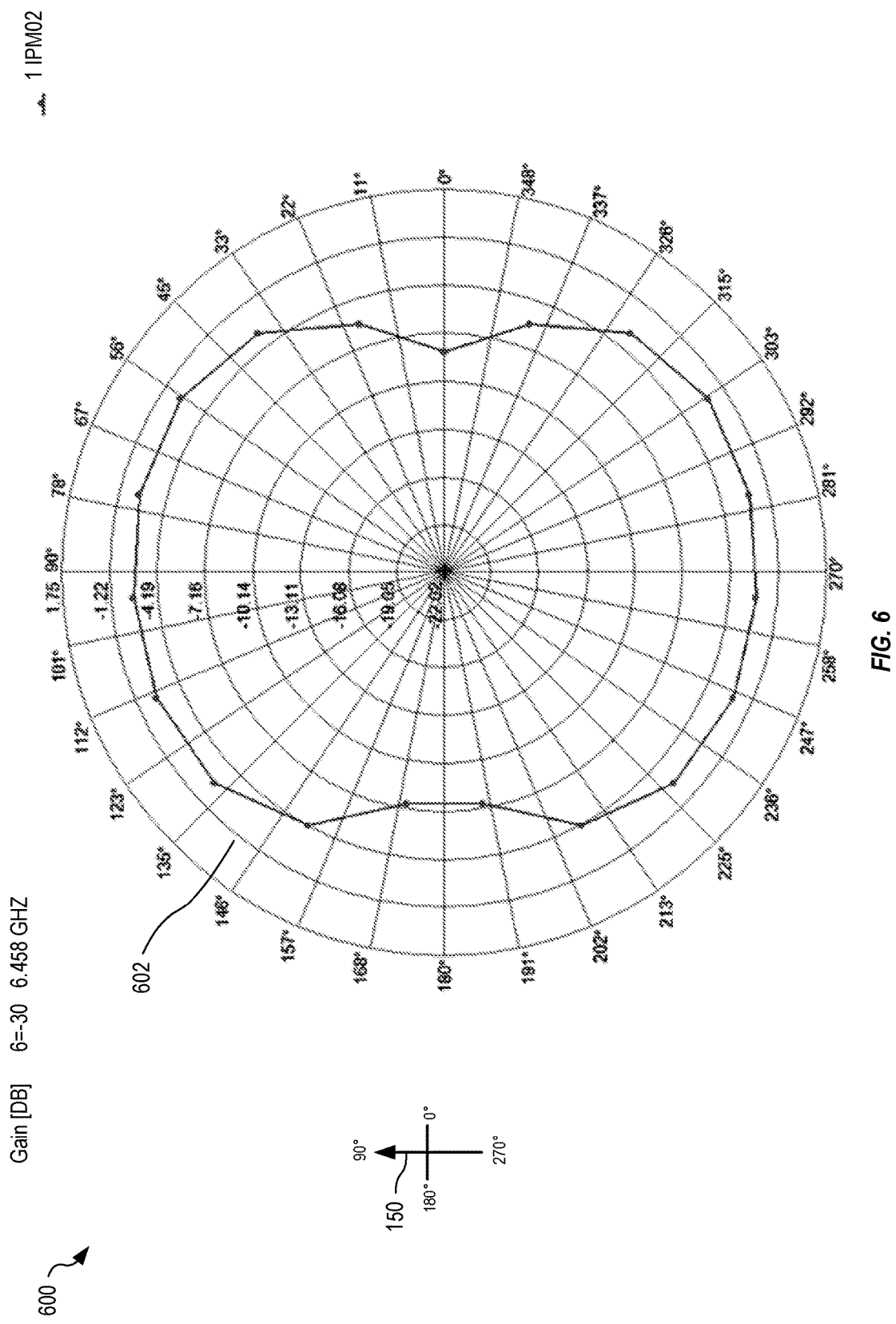
FIG. 6 is a polar plot illustrating exemplary transmission power from the antenna of FIG. 1, in an embodiment.

FIG. 6 is a polar plot 600 illustrating exemplary transmission power 602 from the antenna of FIG. 1, when tilted along the 90°-270° axis to a 30° angle. This tilt of 30° corresponds to orientation of antenna 100 within a UWB tracking tag when located within a shoulder pad of an American Football player. Arrow 150 indicates orientation of polar plot 600 relative to antenna 100 of FIG. 1.

Figure 7:
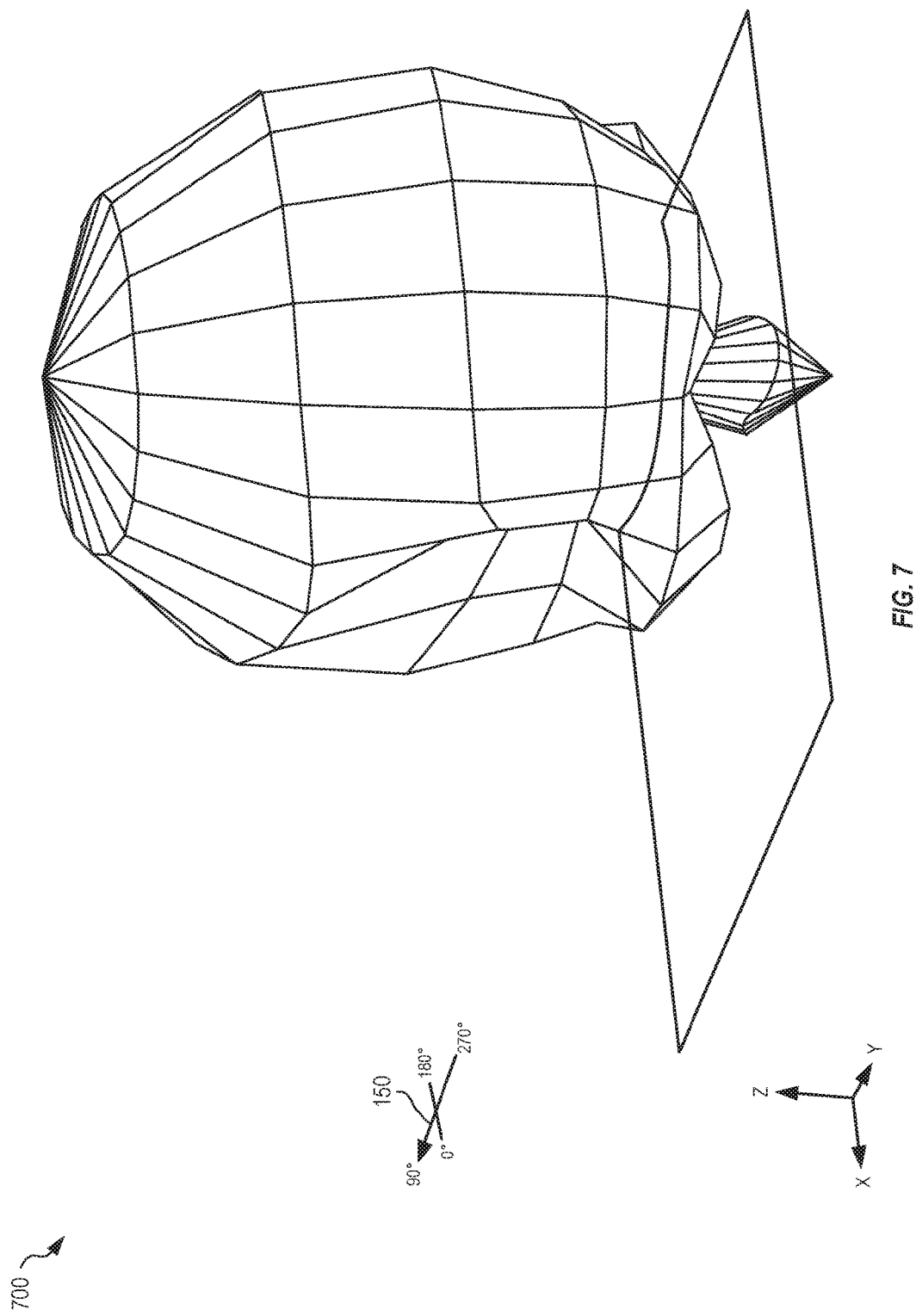
FIG. 7 is a 3D plot illustrating exemplary transmission power from the antenna of FIG. 1, in an embodiment.

FIG. 7 is a 3D plot illustrating exemplary transmission power from the antenna of FIG. 1. Arrow 150 indicates orientation of polar plot 600 relative to antenna 100 of FIG. 1.

Figure 8:
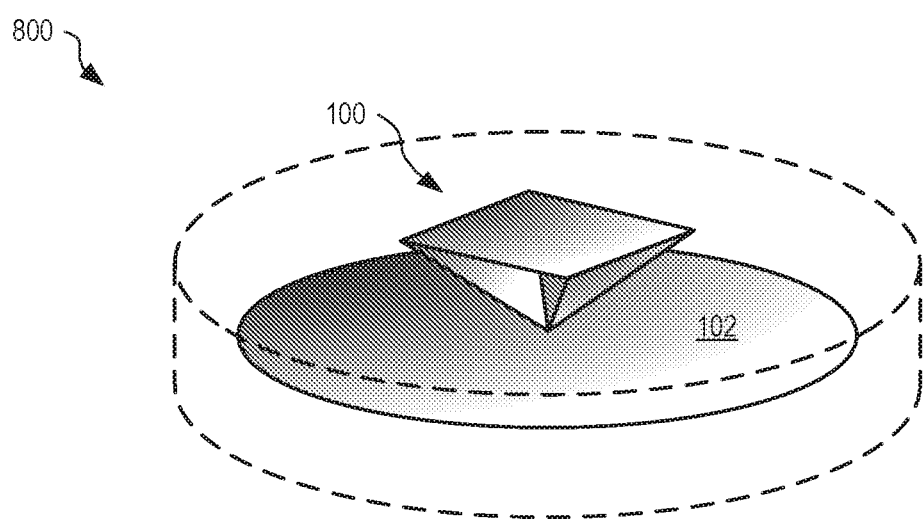
FIG. 8 is a schematic of the antenna of FIG. 1 positioned on an American Football player, in an embodiment.

FIG. 8 shows antenna 100 configured within a tracking tag 800. Tracking tag may also include electronics (e.g., one or more of a receiver, transmitter, transceiver, processor, memory, etc.) and a battery (e.g., a coin cell) that provides power to the electronic components. Tracking tag 800 may also include attachment components to facilitate attachment of tracking tag 800 to an object to be tracked with a desired orientation of antenna 100.

Figure 9:
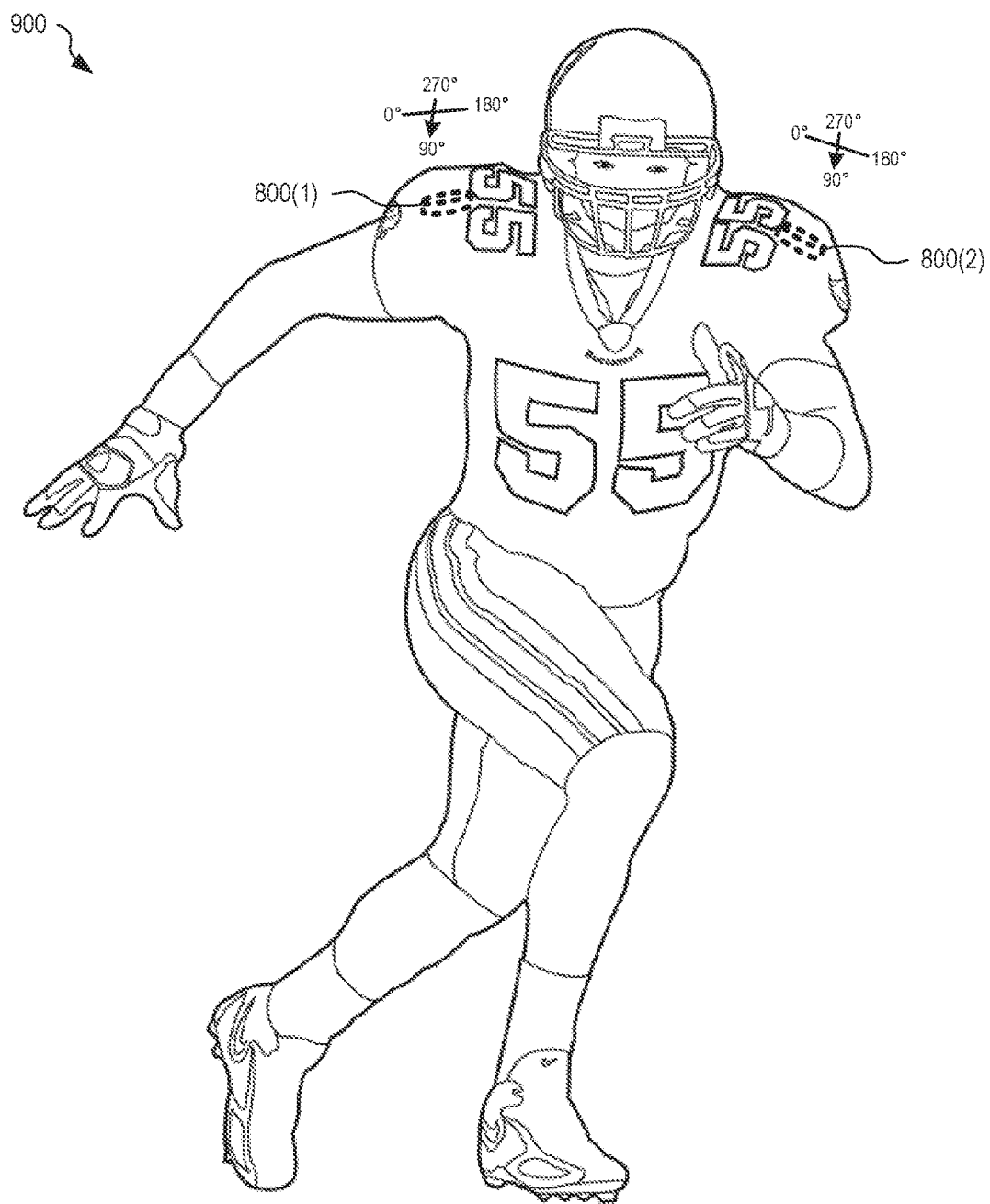
FIG. 9 is a schematic illustrating exemplary positioning of two tracking tags of FIG. 8 on an American Football player to illustrate exemplary orientation of the antenna of FIG. 1 relative to the player, in an embodiment.

FIG. 9 is a schematic illustrating exemplary positioning of two tracking tags 800 of FIG. 8 on an American Football player to illustrate exemplary orientation of the antenna of FIG. 1 to the player. In particular, antenna 100 or oriented such that transmission power in the forward and backward directions is greater than the transmission power in the sideways directions. Thus, less of the transmitted energy is absorbed by the player's body, since less power is transmitted in that direction, as compared to a conventional dipole antenna.

Figure 10:
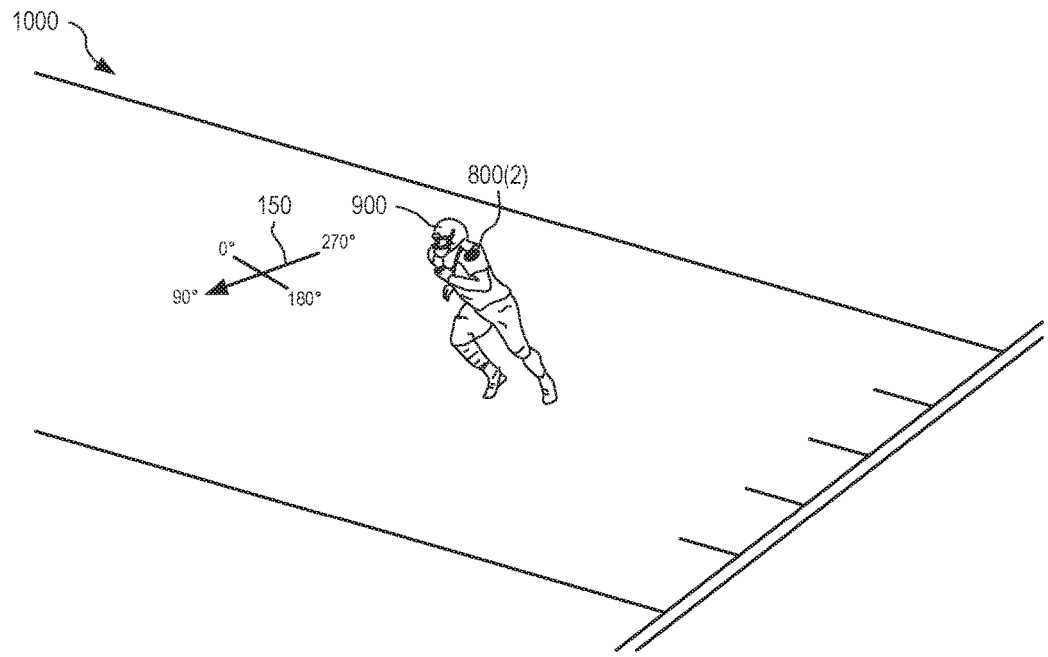
FIGS. 10 and 11 show the player of FIG. 9 on an American Football field illustrating exemplary propagation of transmissions from the tracking tags configured with the player, in an embodiment.
Figure 11:
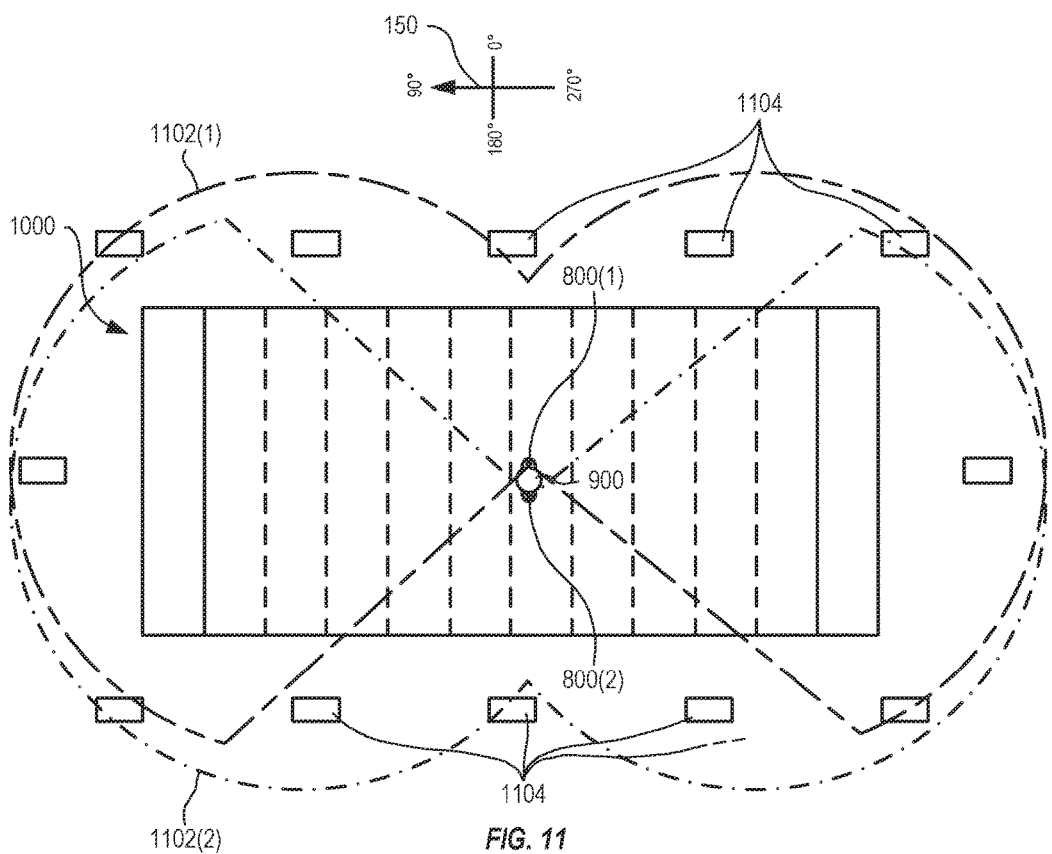

FIGS. 10 and 11 show player 900 of FIG. 9 on an American Football field 1000 illustrating exemplary propagation of transmissions 1102(1) and 1102(2) from tracking tags 800(1) and 800(2), respectively, of player 900. Plays on the American football field are generally up or down the field 1000, as opposed to across the field. Thus, players in general are also facing up and down the length of the field. As shown, field 1000 is surrounded by a plurality of receivers 1104 (also known as anchors) that are configured to receive transmissions from tracking tags 800. The receiver locations and received transmissions are used to determine the location of the tracking tags 800 within the operational area that includes field 1000. At least three receivers 1104 are required to receive a particular transmission to enable location of the corresponding tracking tag 800.

Transmissions 1102 correspond to transmission power 602 of FIG. 6, and also illustrate exemplary blockage by the body of player 900. The shape of antenna 100, and orientation of antenna 100 (i.e., tracking tag 800) determines the shape of the transmission power 602, and its effectiveness at being received by receivers 1104. By shaping antenna 100 such that more power is transmitted in the player's forward/backward direction (i.e., 90-270 degrees relative to the antenna orientation indicated by arrow 150, less power is absorbed by the player's body. Further, since field 1000 is longer than it is wide, more receivers 1104 receive each transmission 1102. The advantages of antenna 100 may be used within tracking tags used to track other players and objects and used with other sports without departing from the scope hereof.

Figure 12:
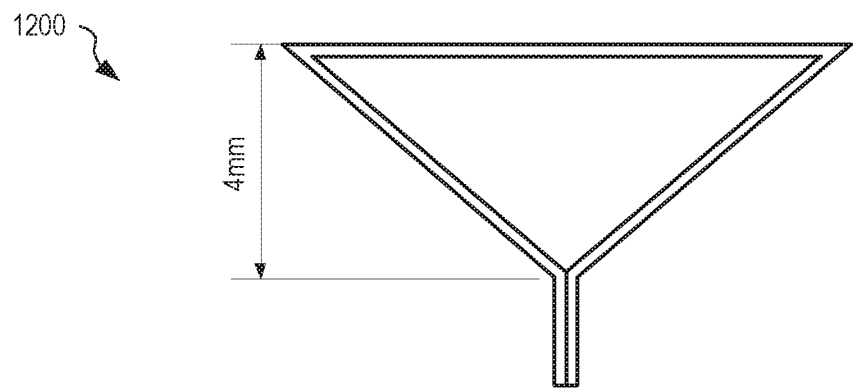
FIGS. 12, 13 and 14 show exemplary variations of the antenna of FIG. 1, in embodiments.
Figure 13:
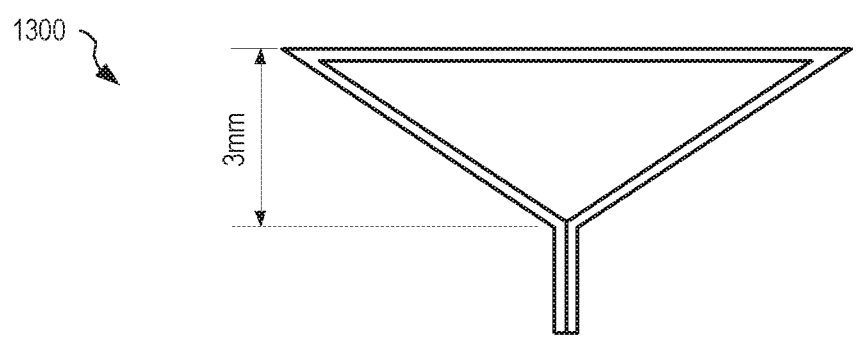
Figure 14:
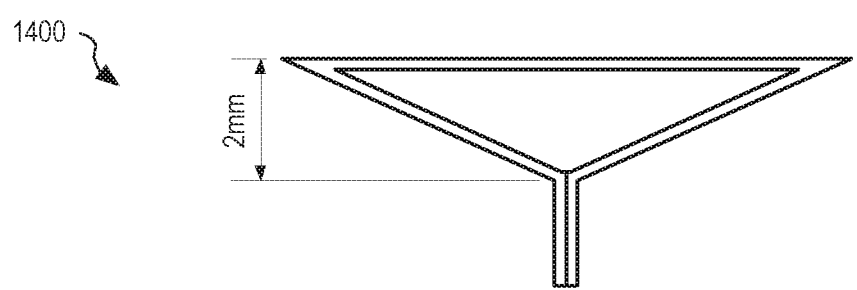

FIGS. 12, 13 and 14 show exemplary variations of antenna 100 of FIG. 1. Antenna 1200 of FIG. 12 is similar to antenna 100 of FIG. 1, but has a height of four millimeters. Antenna 1300 of FIG. 13 is similar to antenna 100 of FIG. 1, but has a height of three millimeters. Antenna 1400 of FIG. 14 is similar to antenna 100 of FIG. 1, but has a height of two millimeters. Above 5 mm there is no significant change in the transmission power of the antenna and below 2 mm in height, the antenna becomes impractical to install.

Figure 15:
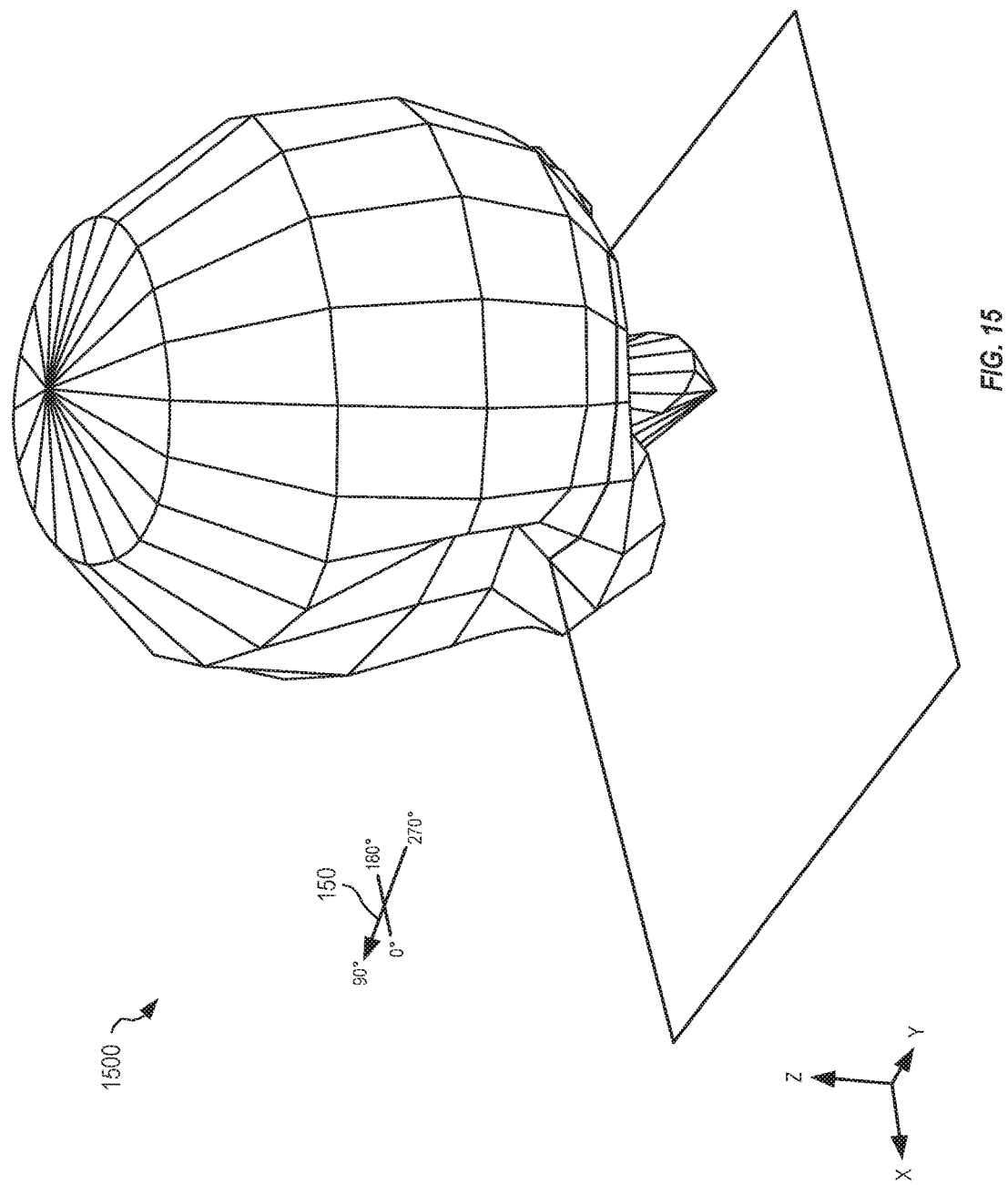
FIGS. 15, 16, and 17 show exemplary 3D plots corresponding to the antennae of FIGS. 12, 13 and 14, respectively, in embodiments.
Figure 16:
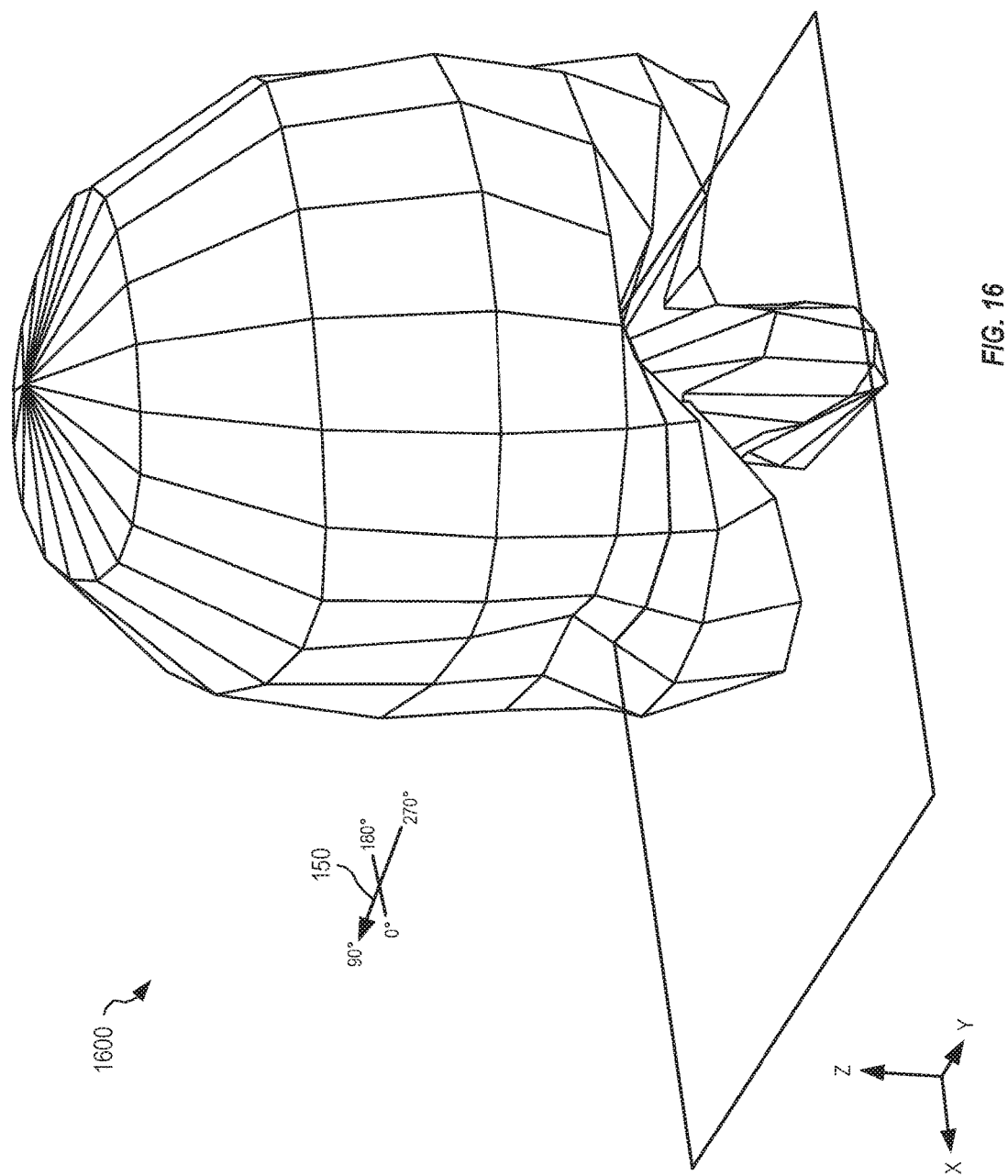
Figure 17:
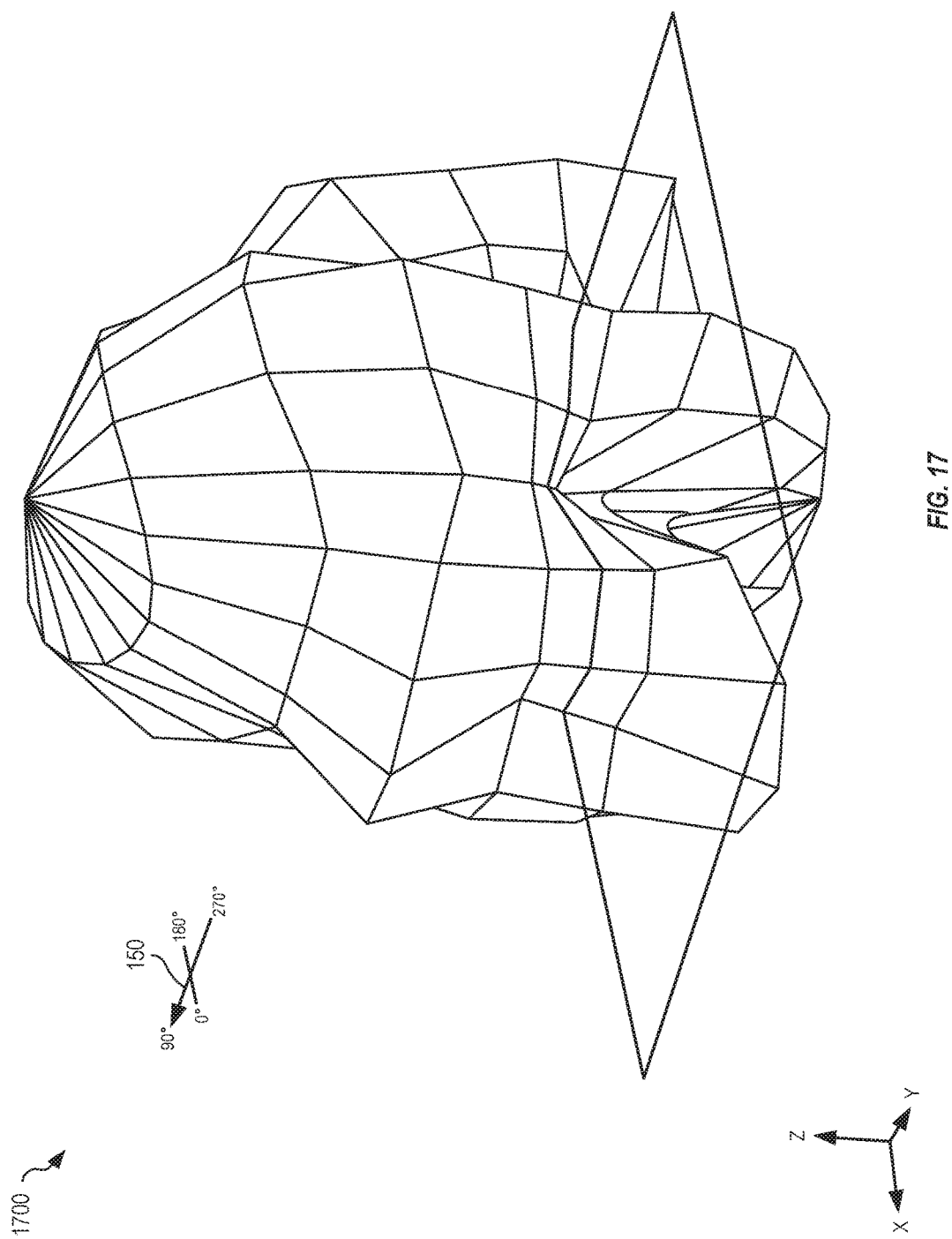

FIGS. 15, 16, and 17 show exemplary 3D plots 1500, 1600, and 1700 corresponding to antenna 1200, 1300, and 1400 of FIGS. 12, 13 and 14, respectively. FIG. 15 is a 3D plot 1500 illustrating exemplary transmission power from the antenna 1200 of FIG. 12. Arrow 150 indicates orientation of polar plot 600 of FIG. 6 relative to antenna 1200. FIG. 16 is a 3D plot 1600 illustrating exemplary transmission power from the antenna 1300 of FIG. 13. Arrow 150 indicates orientation of polar plot 600 of FIG. 6 relative to antenna 1300. FIG. 17 is a 3D plot 1700 illustrating exemplary transmission power from the antenna 1400 of FIG. 14. Arrow 150 indicates orientation of polar plot 600 of FIG. 6 relative to antenna 1400.

Figure 18:
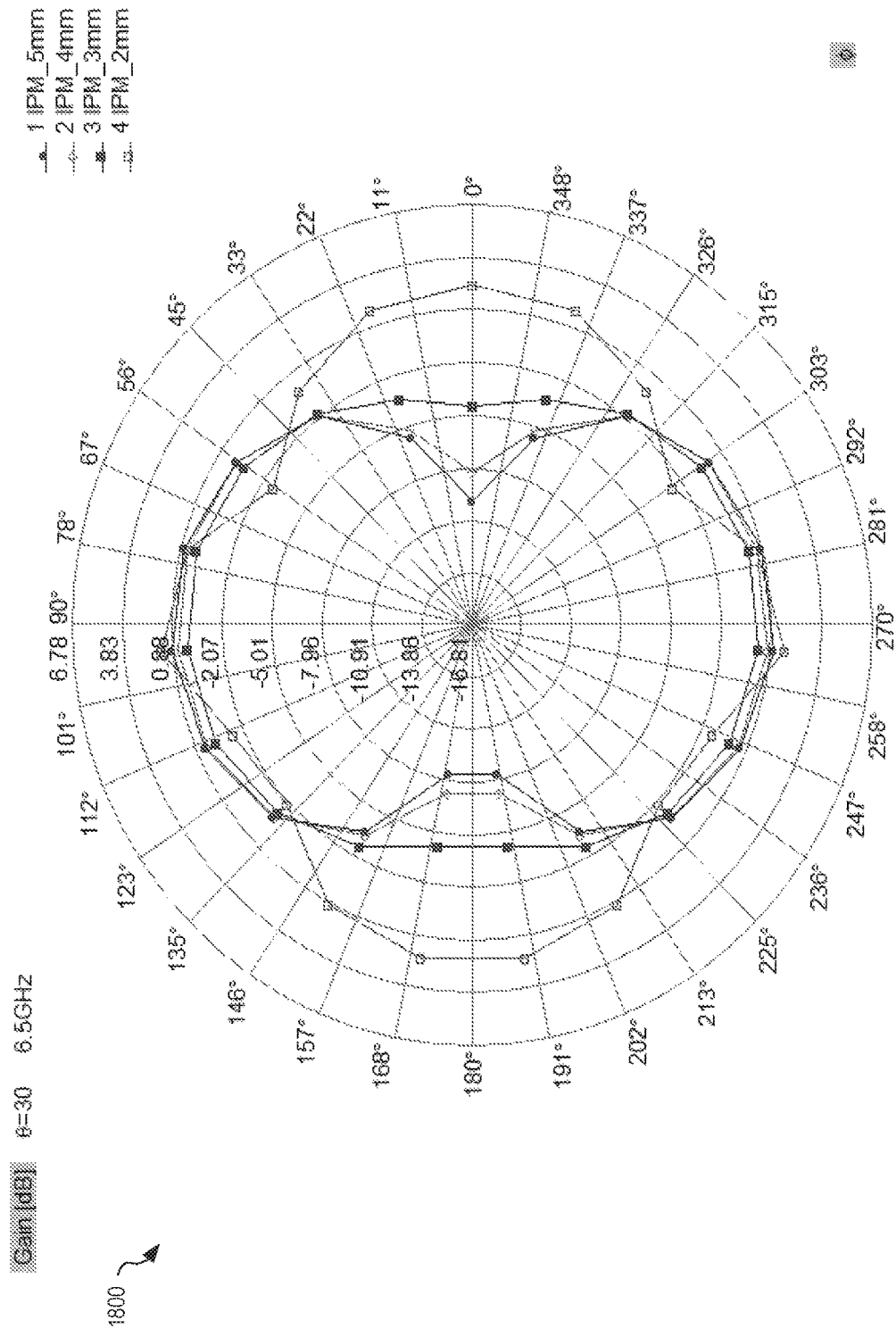
FIG. 18 is polar plot illustrating variation in transmission power of the antennae of FIGS. 12, 13 and 14, respectively.

FIG. 18 is polar plot 1800 illustrating variation in transmission power of the antennae of FIGS. 12, 13 and 14, respectively. FIG. 18 shows that as the height of antenna 100 is reduced, the side lobes are extended. Height if antenna 100 is thus a function of side-lobe transmission power. Classic symmetrical monopoles of the prior art do not allow this variation, particularly not in an easily manufactured way, since these classic symmetrical monopoles art typically manufactured by turning or machining metal. On the other hand, antenna 100 (and similarly antennae 1200, 1300, and 1400) are simply created using laser cut metal sheet that is folded to form the antenna.

Variations on this theme may include non-equal base side lengths, base lines and side lines which are curved either concave or convex, metal type and thickness and different ground plane geometries. These variations allow further manipulation of the radiation pattern, finished shape, and input impedance matching of antenna 100.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween. In particular, the following embodiments are specifically contemplated, as well as any combinations of such embodiments that are compatible with one another:

A. A folded ultra-wide-band (UWB) monopole antenna for a body-mounted transmitter, the antenna having a single metal sheet forming: (i) a flat top; (ii) a first side folded at an acute angle from one edge of the top; (iii) a second side folded at an acute angle from another edge of the top; (iv) a first solder tab folded at an obtuse angle from the first side; and (v) a second solder tab folded at an obtuse angle from the second side, to join in parallel with the first solder tab.

B. In the folded UWB antenna denoted as A, the first and second sides being substantially the same shape and size.

C. In either of the folded UWB antennae denoted as A or B, the first and second solder tabs having similar shape and size to one another.

D. In any of the folded UWB antennae denoted as A-C, the first and second solder tabs configured for soldering in the same hole of a printed circuit board.

E. In any of the folded UWB antennae denoted as A-D, the first and second sides being formed on opposite edges of the top.

F. In any of the folded UWB antennae denoted as A-E, the single metal sheet having tin plating.

G. In any of the folded UWB antennae denoted as A-F, the top comprising a flat polygon.

H. In any of the folded UWB antennae denoted as A-G, the first solder tab being at an opposite end of the first side from the top.

I. In any of the folded UWB antennae denoted as A-H, the second solder tab being at an opposite end of the second side from the top.

J. A method for manufacturing a folded ultra-wide-band (UWB) monopole antenna for a body mounted transmitter, including: cutting, from a flat material, a single metal sheet having a top, first and second sides, and first and second solder tabs; folding the first side at an acute angle from one edge of the top; folding the second side at an acute angle from another edge of the top; folding the first solder tab at an obtuse angle from the first side; and folding the second solder tab folded at an obtuse angle from the second side to join in parallel with the first solder tab.

K. In the method denoted above as J, the step of cutting including stamping.

L. In either of the methods denoted above as J and K, the steps of folding occurring simultaneously after the step of cutting.

M. In any of the methods denoted above as K-L, the top being a flat polygon.

N. In any of the methods denoted above as K-M, the first side being opposite the second side with respect to the top.

O. In any of the methods denoted above as K-N, the first and second solder tabs forming a solderable post.

P. A method for improving tracking performance of an ultra-wide-band (UWB) tracking tag positioned on a player on a sporting field includes: forming a UWB antenna with power radiated disproportionately in forward and backward directions as compared to sideways; and aligning the UWB tracking tag with the UWB antenna when positioned on the player such that less power is absorbed by the player than radiated away from the player.

Q. In the method denoted above as P, the UWB antenna being oriented to maximize range of transmissions from the UWB tracking tag.

R. In either of the methods denoted above as P and Q, the UWB antenna being oriented based upon an expected orientation of the player on the playing field.

S. In any of the methods denoted above as P-R, the UWB antenna being oriented based upon positioning of receivers around the field of play.

T. In any of the methods denoted above as P-S, the UWB antenna being oriented to maximize the number of receivers receiving transmissions from the UWB tracking tag.

U. In any of the methods denoted above as P-T, the UWB tracking tag being positioned at a shoulder of the player.

What is claimed is:

1. A folded ultra-wideband (UWB) monopole antenna, comprising:
a planar top having opposite first and second edges;
a first planar side joined with the planar top along a first fold line located at the first edge, the first planar side forming a first acute angle with the planar top when folded along the first fold line;
a second planar side joined with the planar top along a second fold line located at the second edge, the second planar side mirroring the first planar side about the planar top, the second planar side forming a second acute angle with the planar top when folded along the second fold line;
a first solder tab joined with the first planar side at a third fold line, the first solder tab forming a first obtuse angle with the first planar side when folded along the third fold line; and a second solder tab joined with the second planar side at a fourth fold line, the second solder tab forming a second obtuse angle with the first solder tab with the second planar side when folded along the fourth fold line;

wherein the first and second acute angles and the first and second obtuse angles are selected such that the second solder tab meets the first solder tab.

2. The folded UWB monopole antenna of claim 1, the first and second solder tabs having a similar shape and size.

3. The folded UWB monopole antenna of claim 2, the first and second solder tabs being configured for soldering in the same hole of a printed circuit board.

4. The folded UWB monopole antenna of claim 1, the planar top, the first planar side, the second planar side, the first solder tab, and the second solder tab being formed from a single metal sheet.

5. The folded UWB monopole antenna of claim 1, the planar top being shaped as a polygon.

6. The folded UWB monopole antenna of claim 5, the first planar side having opposite third and fourth edges located at the first fold line and the third fold line, respectively.

7. The folded UWB monopole antenna of claim 6, the second planar side having opposite fifth and sixth edges located at the second fold line and the fourth fold line, respectively.

8. A method for manufacturing a folded ultra-wideband (UWB) monopole antenna, comprising:

cutting, from a flat metal sheet, a planar top, a first planar side joined with the planar top at a first fold line, a second planar side joined with the planar top at a second fold line, a first solder tab joined with the first planar side at a third fold line, and a second solder tab joined with the second planar side at a fourth fold line;

folding the first planar side along the first fold line to form a first acute angle between the planar top and the first planar side;

folding the second planar side along the second fold line to form a second acute angle between the planar top and the first planar side;

folding the first solder tab along the third fold line to form a first obtuse angle between the first planar side and the first solder tab; and folding the second solder tab along the fourth fold line to form a second obtuse angle between the second planar side and the second solder tab so that the second solder tab meets the first solder tab.

9. The method of claim 8, wherein the cutting comprises stamping.

10. The method of claim 8, wherein the cutting precedes the folding.

11. The method of claim 10, the planar top being shaped as a polygon.

12. The method of claim 10, the first and second fold lines being located on opposite edges of the top portion.

13. The method of claim 12:

the first and third fold lines being located on opposite edges of the first planar side; and the second and fourth fold lines being located on opposite edges of the second planar side.

* * * * *

UNITED STATES PATENT AND TRADEMARK OFFICE
CERTIFICATE OF CORRECTION

PATENT NO. : 10,446,934 B2
APPLICATION NO. : 15/780982
DATED : October 15, 2019
INVENTOR(S) : Alexander T. Farkas Page 1 of 1

It is certified that error appears in the above-identified patent and that said Letters Patent is hereby corrected as shown below:

In the Claims

In Claim 8, at Column 8, Lines 7-9:
"folding the second planar side along the second fold line to form a second acute angle between the planar top and the first planar side"
Should read:
-- folding the second planar side along the second fold line to form a second acute angle between the planar top and the second planar side --

Signed and Sealed this
Third Day of December, 2019

Andrei Iancu
*Director of the United States Patent and Trademark Office*